United States Patent [19]

Esten

[11] Patent Number: 4,506,445
[45] Date of Patent: Mar. 26, 1985

[54] RESCUE CUTTER TOOL

[75] Inventor: Harold Esten, Glenside, Pa.

[73] Assignee: Hale Fire Pump Company, Conshohocken, Pa.

[21] Appl. No.: 468,183

[22] Filed: Feb. 22, 1983

[51] Int. Cl.³ .............................................. B26B 15/00
[52] U.S. Cl. .......................................... 30/228; 30/92; 30/266; 83/604; 83/639
[58] Field of Search ................. 30/228, 251, 252, 134, 30/92, 266; 83/639, 604

[56] References Cited

U.S. PATENT DOCUMENTS

| | | | |
|---|---|---|---|
| 1,572,546 | 2/1926 | McKenney | 30/252 |
| 3,296,697 | 1/1967 | Hedstrom | 30/251 |
| 3,819,153 | 6/1974 | Hurst | 72/392 |
| 3,837,076 | 9/1974 | Good | 30/228 |
| 4,283,851 | 8/1981 | Wolter | 30/134 |
| 4,392,263 | 7/1983 | Amoroso | 30/134 |

FOREIGN PATENT DOCUMENTS 476306 12/1937 United Kingdom ................. 30/228

Primary Examiner—Jimmy C. Peters
Attorney, Agent, or Firm—Brooks & Kushman

[57] ABSTRACT

A lightweight, fluid-powered, portable rescue cutter tool for applying a high magnitude cutting force is disclosed comprising a body having a longitudinal axis including a fluid cylinder and a forward end structure, and a pair of cutting blades pivotally connected to the forward end structure. Fluid-actuated force means are movable along the longitudinal axis of the body and linking means, asymmetrically secured to the cutting blades and interconnecting the fluid actuated force means with the cutting blades, are utilized for pivoting the cutting blades between non-cutting open and closed cutting positions. Handles are provided for manipulating and supporting the rescue cutter tool and control means are provided adjacent one of the handles for controlling the fluid-actuated force means to pivot the cutting blades between non-cutting and cutting positions as desired.

7 Claims, 7 Drawing Figures

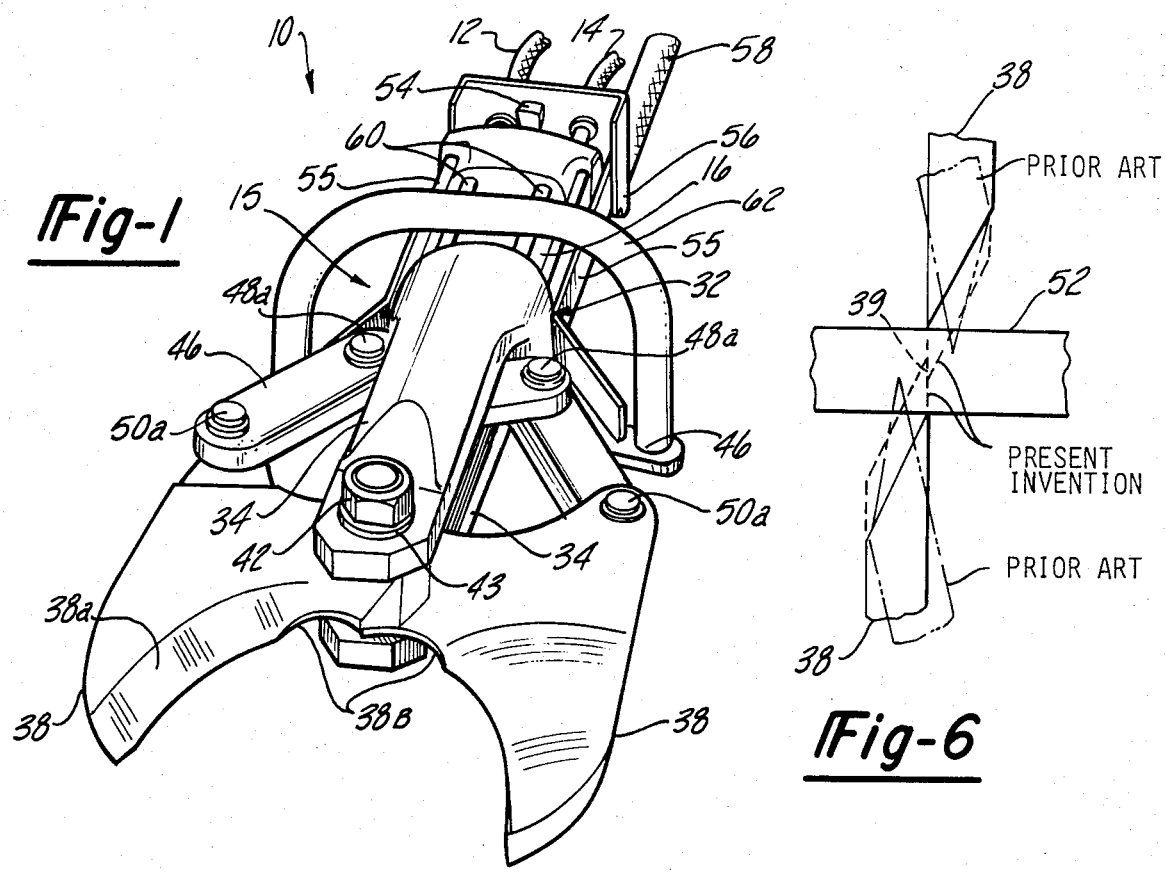

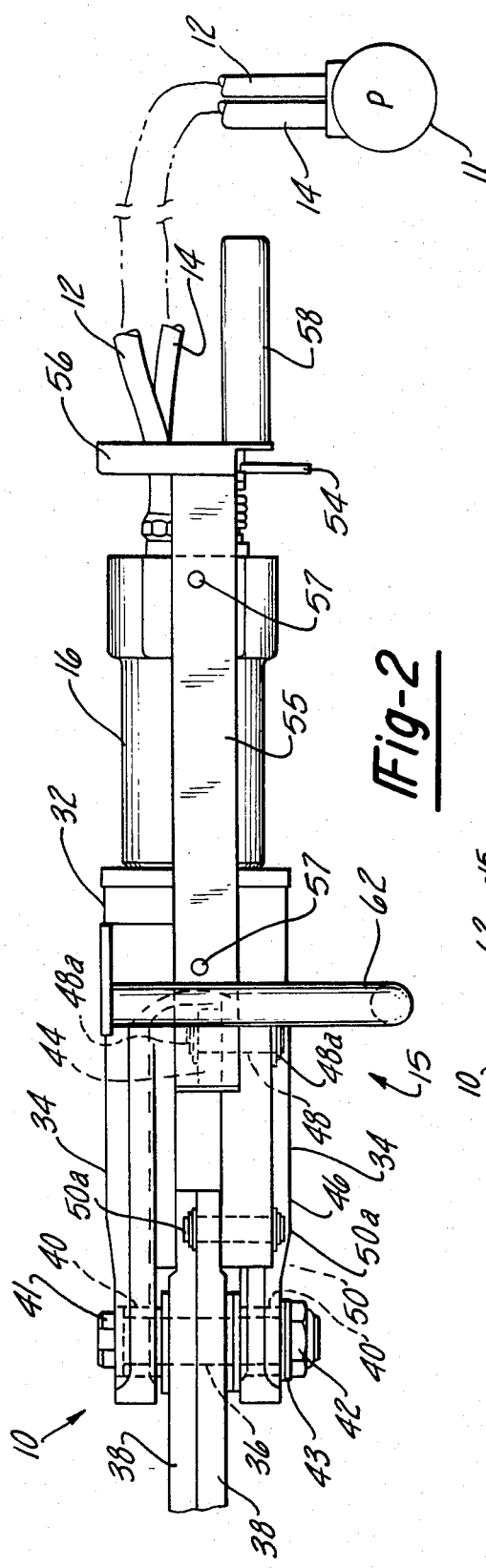
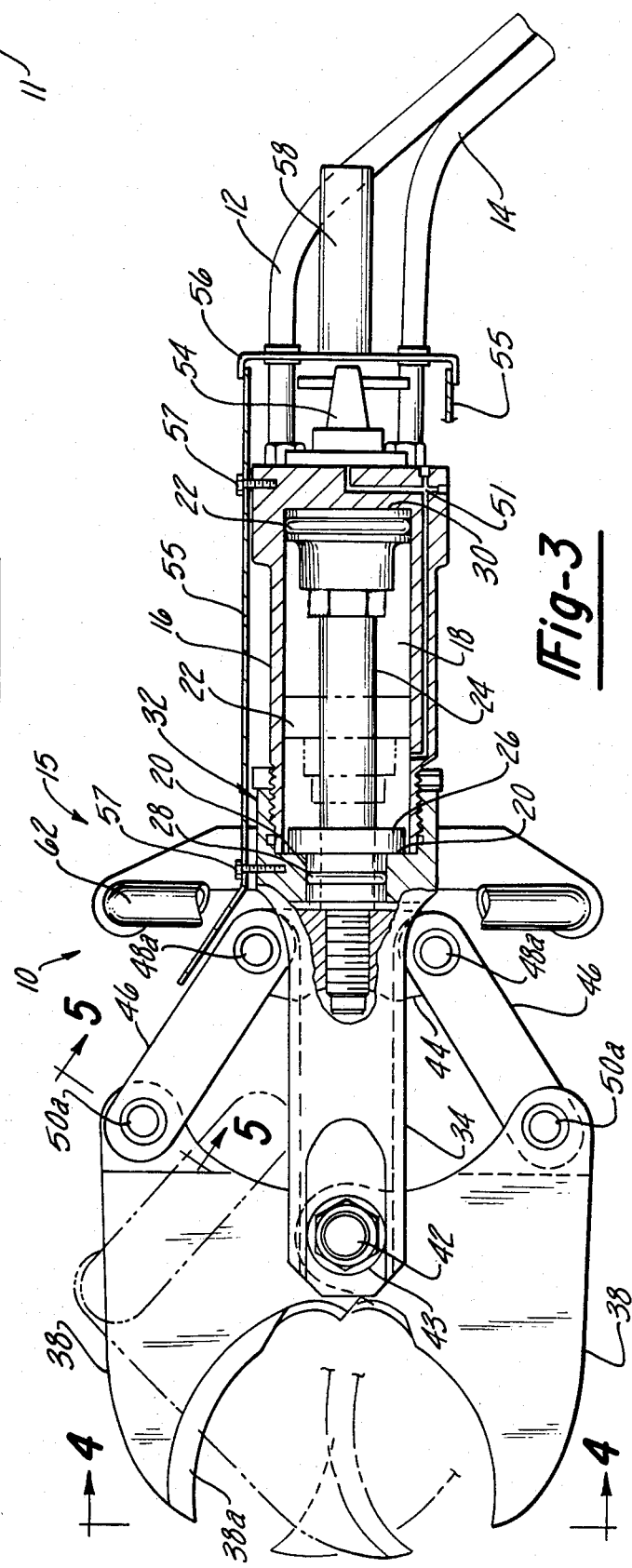

RESCUE CUTTER TOOL

BACKGROUND OF THE INVENTION

The present invention relates to a new and improved lightweight, fluid-powered, readily manipulatable and portable rescue cutter tool for applying high magnitude cutting forces. The portable rescue cutter tool in accordance with the present invention is particularly well adapted for aiding in the rescue of accident victims which are trapped in a wreckage and for cutting such items as chain links and security fences, heavy sheet metal barriers, etc., in critical seconds. The present invention is also useful in separating wreckages and/or salvage operations and the like.

BACKGROUND ART

Often at the scene of an automobile accident and other disasters, it is necessary to rapidly cut through metal and other materials to reach trapped victims and remove or extricate the victims to provide the necessary medical treatment. Common means for achieving the freeing of accident victims from wreckages are the use of acetylene gas torches to cut through metal and mechanisms such as rotary grinding wheels or saws. These devices present many hazards often caused from fires, excessive heat and flying abrasives. An additional drawback to the use of these items is that there is often not electricity available to operate these mechanisms and they tend to work notoriously slow in the precious time available.

To alleviate these problems, portable, power-operated rescue tools have been used to free trapped accident victims. Examples of such devices are U.S. Pat. No. 3,837,076 which discloses a power-operated, portable shear device operated by fluid pressure from a pump, such as the water pump on a fire engine, and U.S. Pat. No. 3,819,153 which discloses a fluid-powered rescue tool utilizing a base and a pair of force arms to apply a high magnitude push-pull force for removing occupants from wreckages and for separating wreckages of cars which have become entangled together.

The problem in this art and with these types of devices is that when it is attempted to cut through a thick piece or bar or metal or cable to rescue a trapped accident victim, the member being cut tends to rotate, wedging itself between the cutting blades, causing them to separate. The separation can become severe enough to cause blades to fracture with possible harm to the operator or others in the proximity and, of course, disables the device, thereby preventing the member from being cut so the injured occupant can be rescued.

SUMMARY OF THE INVENTION

It is the object of the present invention to provide a new and improved fluid-powered, portable rescue cutter tool which allows for the rapid cutting of thick metal members while preventing the member being cut from twisting to prevent separation and fracturing of the cutting blades.

Another object of the present invention is to provide a linking means between the fluid-actuated force means and cutting blades causing bending and twisting moments in the cutting blades biasing them toward each other to prevent the separation and fracturing problems in these types of devices.

Another object of the present invention is to provide a new and improved rescue cutter tool whereby the tool may be oriented in any direction and be easily used by either a single right or left-handed operator, without requiring aid from others.

Another object of the present invention is to provide a tool of the character described which is capable of being rapidly put into operation upon arrival at an accident site.

In carrying out the above objects of the present invention, a new and improved lightweight, compact, fluid-powered, portable rescue cutter tool which is capable of applying high magnitude cutting forces is disclosed. The cutter tool is powered by a lightweight, portable, self-contained fluid power generating unit or pump which may be conveniently carried by a rescue vehicle, etc. The pump supplies pressurized hydraulic fluid via a flexible hydraulic supply line, and a hydraulic return line is provided for the recycling of low pressure hydraulic fluid.

The rescue tool is comprised of a body having a longitudinal axis including an elongated, hollow tubular housing and a forward end structure including a pair of longitudinally extending support brackets disposed equidistant and on opposite sides of the longitudinal axis. The housing includes a cylindrical fluid chamber having an annular, integrally formed forward end wall. A fluid-actuated piston is slidably disposed within the cylinder for controlled movement along the longitudinal axis. The piston is secured to the rearward end of a piston rod with the forward end of the piston rod extending out of the cylinder through a circular opening in the forward end wall. An annular sealing ring is disposed in the forward end wall to prevent fluid leakage around the piston at the forward end of the cylinder. The sealing ring includes a piston rod sleeve bearing to support and guide the piston rod in its axial movement. The rearward end of the cylinder is closed by an integrally formed rear end wall.

The supporting brackets at the forward end structure are aligned to carry a fixed pivot axle for supporting a pair of high strength steel cutting blades having opposite sides and being movable between non-cutting open and closed cutting positions. The axle is disposed normal to the longitudinal axis of the body and forms a pivot axis for the cutting blades relative to the tool body.

A pivot bar disposed between the flanges is provided which is secured to the forward end of the piston rod. The pivot bar is pivotally interconnected to the cutting blades by linkage means which comprise a pair of links. One end of each link is asymmetrically and pivotally connected to the pivot bar and the opposite end of each link is asymmetrically and pivotally connected to one side of each cutting blade.

The rescue tool is operated by the use of a switch located at the rear end of the body. The movement of the switch introduces pressurized hydraulic fluid to opposite sides of the piston moving the cutting blades between non-cutting open and closed cutting positions as desired. When pressurized fluid is introduced between the piston and rear end wall of the cylinder, the piston is moved in a forward direction along the longitudinal axis, thereby driving the piston rod and pivot bar forward. The pivot bar drives the links forward, thereby pivoting the cutting blades about the axle to their closed cutting positions. When it is desired to move the blades to their open non-cutting positions, the switch is activated and pressurized hydraulic fluid is introduced between the piston and forward end wall, thereby moving the piston and piston rod in a rearward direction along the longitudinal axis. The movement of the piston rod pulls the pivot bar and links rearward, pivoting the cutting blades about the axle to their open non-cutting positions.

A pair of handles is provided for manipulating and controlling the rescue cutter tool while it is being used. The handles are disposed and are of a configuration such that the tool may be used by either a single right or left-handed operator. The switch is preferably located near one of the handles so that the rescue cutter tool may be operated without the operator moving his hands from the handles during use.

The objects, features, and advantages of the present invention are readily apparent from the following detailed description of the best mode for practicing the invention when taken in connection with the accompanying drawings.

BRIEF DESCRIPTION OF THE DRAWINGS

FIG. 1 is a top perspective view of the rescue cutter tool constructed in accordance with the present invention;

FIG. 2 is a side elevational view, partially in section, of the rescue cutter tool constructed in accordance with the present invention;

FIG. 3 is a top elevational view, partially in section, of the rescue cutter rool constructed in accordance with the present invention;

FIG. 4 is a front elevational view taken along line 4—4 of FIG. 3;

FIG. 5 is a partial sectional view taken along line 5—5 of FIG. 3; and

FIG. 6 is a schematic showing a comparison of the cutting blades of the present invention with that of prior art devices.

BEST MODE FOR CARRYING OUT THE INVENTION

Referring to the drawings, a new and improved, lightweight, fluid-powered, portable rescue cutter tool which is capable of applying high magnitude cutting forces is constructed in accordance with the features of the present invention. The cutter tool is generally referred to by reference numeral 10 as shown in FIGS. 1, 2 and 3. The rescue cutter tool is especially well suited for use at the scene of vehicular accidents and the like. The lightweight tool can be operated with relative ease by a single, unskilled operator. The cutter tool is not only well adapted for general emergency use by ambulance, fire, police, race track and other rescue teams and personnel, but is also applicable in a wide variety of accident or emergency situations which may involve aviation, marine, construction, mining, farm, trains, industrial, salvage and any situations where a rapid, high magnitude cutting force application is required.

In accordance with the present invention, the rescue cutter tool 10 is fluid powered by a lightweight, portable, self-contained fluid power generating unit or pump 11. The pump 11 should be light in weight and compact in size to be conveniently carried in a rescue vehicle, aircraft, helicopter, etc. The pump 11 should preferably provide sufficient hydraulic pressure for a cutting force of approximately 12–15 tons and allow for the opening or closing of the cutter tool 10 within about five seconds.

Hydraulic fluid is supplied from the pump 11 under pressure to the tool 10 through a high pressure, flexible, hydraulic supply line 12. Low pressure, exhausted hydraulic fluid is returned from the rescue cutter tool 10 to the pump 11 via a flexible, hydraulic return line 14. The hydraulic lines 12 and 14 are preferably bound together in a flexible bundle so as not to interfere with the operator's manipulation of the rescue tool 10. The supply and return lines 12 and 14 preferably include quick release couplings to readily attach the tool 10 to the pump 11.

The tool 10 comprises a body 15 having a longitudinal axis including an elongated, hollow tubular main housing 16 being preferably formed of a high strength, lightweight material such as a finished carbon steel and a forward end structure collectively identified by reference numeral 32.

The housing 16 includes an elongated, cylindrical fluid chamber or cylinder 18 having relatively thin, high strength walls, enclosed a the forward end by an annular, integrally formed forward end wall 20 as shown in FIG. 3. A fluid-actuated piston 22, also shown in FIG. 3, is slidably disposed within the cylinder 18 for controlled movement along the longitudinal axis toward and away from opposite ends of the cylinder. The piston 22 is secured to the rearward end of a piston rod 24 by means of screw-threaded engagement.

The forward end of the piston rod 24 extends out of the forward end of the cylinder through a circular opening in the forward end wall 20. A high pressure, sealing and packing ring 26 is seated in the annular forward end wall 20 to prevent fluid leakage around the piston rod 24 at the forward end of the cylinder 18. Within the packing ring 26 is a piston rod sleeve bearing 28 to support and guide the piston rod in its axial movement. The rearward end of the cylinder 18 is closed by an integrally formed rear end wall 30.

As shown in FIG. 3, the piston 22 is formed of three sections of decreasing diameter, the section having the smallest diameter being secured to the rearward end of the piston rod 24. The largest diameter of the piston 22 provides a seal, with the next diameter being for clearance and the smallest diameter having wrench flats for tightening the piston 22 to the piston rod 24. The longitudinal axis of reciprocation of the piston rod 24 and the cylinder 18 defines the general, longitudinal axis of the body 15 and of the rescue cutter tool 10 as a whole and by supplying pressurized fluid to either forward or rearward sides of the piston 22, the piston rod 24 is powered to extend or retract along its axis relative to the tool body 15.

The forward end structure 32 includes a pair of parallel, spaced-apart, longitudinally extending support brackets or flanges 34 as shown in FIGS. 1, 2 and 4, and is secured to the housing 16 by means of screw-threaded engagement as shown in FIG. 3. The flanges 34 are spaced equal distances above and below the longitudinal axis of the tool 10 and cylinder 18. The flanges 34 are aligned to carry a fixed pivot axle or pin 36 for supporting a pair of high strength steel cutting blades 38 having opposite sides and being movable between non-cutting open and closed cutting positions, as shown in FIG. 1. The supporting flanges 34 include openings 40 through which axle 36 passes and is secured as shown in FIG. 2. The axle 36 is disposed normal to the longitudinal axis of the body 15 and has a head 41 at one end and is secured at the other end by a bolt 42 and washers 43, as shown in FIG. 5B. The front outer surfaces of the flanges 34 provide a flat surface for the mounting of the axle 36. The axle 36 forms a fixed pivot axis for the cutting blades 38 relative to the body 15.

At the forward end of the piston rod 24, a pivot bar 44 disposed between the flanges 34 is provided as shown in FIGS. 1 and 3. The pivot bar 44 is secured to the forward end of the piston rod 24 by means of screw-threaded engagement as shown in FIG. 3. The pivot bar 44 is pivotally interconnected to the cutting blades 38 by links 46, preferably made of steel, as shown in FIGS. 1 and 3. The links 46 are disposed on opposite sides of the longitudinal axis and are pivotally interconnected to the pivot bar 44 and cutting blades 38 by means of pins and fasteners 48, 48A and 50, 50A, respectively. The links preferably have chamfered ends and one end of each link 46 is asymmetrically and pivotally connected to the pivot bar 44 with the opposite end of each link 46 being asymmetrically and pivotally connected to the cutting blades 38 on only one side of each blade, as shown in FIGS. 1 and 4. Alternatively, the links 46 may be symmetrically and pivotally connected to the pivot bar 44.

The operation of the rescue cutter tool is effectuated by the use of a spring-loaded switch 54 located at the rear end of the body 15. The operator can move the switch in two directions based on whether it is desired to open or close the cutting blades 38. A decal is provided near the switch 54 on the housing to indicate to the operator the direction in which the switch must be moved to open or close the cutting blades 38.

The cutting blades 38 are movable between non-cutting open and closed cutting positions in response to the application of pressurized fluid to opposite sides of the piston 22. Referring to FIG. 3, the open positions of the cutting blades 38 are shown in full lines, with the closed positions of the cutting blades 38 being shown in phantom lines. When the cutting blades 38 are in their open, non-cutting positions and it is desired to close the blades for cutting, the switch is pressed in the direction indicated on the decal and pressurized hydraulic fluid is introduced, via supply line 12 through passageways (not shown), between piston 22 and rear end wall 30 of the cylinder 18, thereby forcing the piston along the longitudinal axis toward the forward end wall 20. The movement of the piston toward the forward end wall 20 drives the piston rod 24 and pivot bar 44 toward the axle 36, thereby driving links 46 into cutting blades 38. The driving of the links 46 pivots cutting blades 38 around the axle 36, thereby moving them into their closed cutting positions and cutting the material or member that is desired to be cut. When the cutting blades 38 are in their closed cutting positions, a side of each cutting blade comes into contact with each other as indicated by reference numeral 39 in FIG. 6. When the piston 22 is driven toward the forward end of the cylinder 18, as shown in FIG. 3, the low-pressure hydraulic fluid between the piston 22 and forward end wall 20 is removed from the tool through passageways 51 and returned to the pump 11 via return line 14 for recycling and repressurization.

When it is desired to open the cutting blades 38 after cutting has been completed, the movement of the switch 54 in the direction indicated on the decal forces pressurized hydraulic fluid through passageways 51 into the cylinder 18 between the piston 22 and forward end wall 20, thereby forcing the piston along the longitudinal axis toward the rear end wall 30. The movement of the piston 24 toward the rear end wall 30 pulls the piston rod 24 and the pivot bar 44 rearward. This rearward movement of the pivot bar 44 pulls the links 46 rearward, thereby pivoting, separating and opening the cutting blades 38. When the pressurized fluid is introduced via supply line 12, the low-pressure hydraulic fluid between the piston 22 and rear end wall 30 is forced into passageways (not shown) and to the return supply line 14 where it is returned to the pump 11 for recycling and repressurization.

To aid in the manipulation and stability of the rescue cutter tool, supporting brackets 55 having a rear bracket 56 are provided which secure a rear handle 58 to the tool. The rear handle 58 may be a straight cylindrical member of uniform diameter as disclosed herein, or may be of a triangular or other configuration which may be grasped from either side of the tool 10. Supporting brackets 55 are secured with screws 57 as shown in FIGS. 2 and 3. The rear bracket 56 further includes openings through which the supply and return lines 12 and 14 pass. The lines 12 and 14 pass through clearance holes in the rear bracket 56 to prevent them from being tangled during use.

In the embodiment disclosed, the housing 16 preferably has a larger diameter at its rearward end. Accordingly, additional supporting bars 60 may be provided as shown in FIG. 1. Finally, a U-shaped handle 62 is provided and secured to the forward end of housing 16 to aid in the manipulation of the rescue cutter tool. The U-shaped handle 62 is preferably hollow to reduce the weight of the tool 10. The U-shaped handle 62, when combined with the configuration of the rear handle 58, allows the tool to be operated from either side by either a single right or left-handed operator.

In the embodiment disclosed, the switch 54 is preferably located adjacent the rear handle 58 so the user can operate the tool 10 without taking his hands off the handles. In alternative embodiments, the switch 54 may be located near the U-shaped handle 62 at the forward end of the housing 16. In any embodiment of the present invention, the switch 54 should be located such that the user can operate the tool without removing his hands from the handles during use.

In the preferred embodiment, cutting blades 38 include beveled edges 38A as shown in FIGS. 1 and 3. The blades may further include an inside edge 38B, as shown in FIGS. 1 and 3, designed for cutting steel cables and the like. The links 46 are preferably asymmetrically and pivotally connected to the sides of the cutting blades 38 which have the beveled edges 38A.

The present invention alleviates the tendency of the failure of these types of devices to cut thick metal members, cables or bars. Referring to FIG. 5A, prior art devices often include a symmetric connection of the link 46 and cutting blades 38. The prior art symmetric connection causes a symmetric distribution of force F on the links 46 which is reacted by an equivalent symmetric force F from the cutting blades 38. The symmetric force distribution does not bias the cutting blades together, thereby enabling the separation and fracturing problems.

This problem is illustrated in FIG. 6 in which a member 52 is shown being cut by prior art devices and the present invention. With the prior art cutters, the member 52 tends to rotate, thereby separating the cutting blades which can cause the blades to fracture with possible harm to the operator or others in proximity, and preventing the member 52 from being cut. The asymmetric connection of the links 46 to the cutting blades 38 in the present invention prevents the member 52 from rotating, thereby allowing the cutting blades 38 to perform their proper cutting function. This asymmetric connection causes an asymmetric force F on the links 46 as shown in FIG. 5B. The asymmetric force F is reacted by a force F and bending and twisting moments M in the cutting blades 38 which biases them toward each other during cutting. These moments are reacted by the member 52 which precludes rotation of the latter and in turn prevents blade separation and fracturing.

From the foregoing, it will be seen that the rescue cutter tool 10 constructed in accordance with the present invention provides an extremely useful tool for accident situations, and is especially adapted for providing high magnitude cutting forces in a precisely and readily controlled manner. The rescue cutter tool 10 is portable and easily positioned and manipulated and is light enough in weight and compact enough in size to be easily handled by one man. The rescue cutter tool 10 described herein further avoids the separation and fracturing problems inherent in the prior art devices.

While the best mode for practicing the invention has been described herein in detail, those familiar with the art to which this invention relates will recognize various alternative designs in the embodiment for practicing the invention as defined by the following claims.

What is claimed is:

1. A hydraulically powered, hand-manipulatable rescue cutter tool comprising:

a body having a longitudinal axis, said body including a fluid cylinder and a forward end structure;

a pair of cutting blades pivotally connected on the forward end structure about an axis which is normal to the longitudinal axis of the body, said cutting blades each including opposite sides and cutting edges, and being movable between non-cutting open and closed cutting positions; a side of each cutting blade coming into contact with the other when the cutting blades are in their closed cutting position;

fluid powered means pivoting said cutting blades between opened and closed positions, said fluid powered means including a piston slidable in said cylinder, a piston rod projecting outwardly through an opening in the forward end structure, and linking means including a pair of links, each of said links pivotally interconnecting a forward end of the piston rod with one of the cutting blades, each of said links being asymmetrically connected to one of the cutting blades only on the side opposite the side of each cutting blade which comes in contact with the other when the cutting blades are in their closed positions;

a pair of handles secured to the tool for supporting and manipulating the tool;

and control means adjacent at least one of the handles for controlling the fluid power means to open and close the cutting blades.

2. A rescue tool as in claim 1 wherein each of said links has one end pivotally connected to the forward end of the piston rod and the other end asymmetrically and pivotally connected to one of the cutting blades.

3. A rescue tool as in claim 1 wherein each of said links has one end pivotally and symmetrically connected to the forward end of the piston rod and the other end asymmetrically and pivotally connected to one of the cutting blades.

4. A rescue tool as in claim 1 wherein each of said links has one end pivotally and asymmetrically connected to the forward end of the piston rod and the other end asymmetrically and pivotally connected to one of the cutting blades.

5. A rescue tool as in claims 2, 3 or 4 wherein each cutting edge is beveled on one side of each cutting blade.

6. A rescue tool as in claim 5 wherein each link is asymmetrically and pivotally connected to the beveled side of each cutting blade.

7. A rescue tool as in claims 1, 2, 3 or 4 wherein said pair of handles comprises a forward U-shaped handle secured to a forward portion of the tool and a rear handle secured to a rear portion of the tool.

* * * * *